(12) United States Patent
Renner

(10) Patent No.: US 9,598,028 B2
(45) Date of Patent: Mar. 21, 2017

(54) RACEWAY FOR FASTENING, GUIDING AND/OR PROTECTING ELECTRIC CABLE MEANS

(71) Applicant: AIRBUS HELICOPTERS DEUTSCHLAND GMBH, Donauworth (DE)

(72) Inventor: Uwe Renner, Friedberg (DE)

(73) Assignee: Airbus Helicopters Deutschland GmbH, Donauworth (DE)

(*) Notice: Subject to any disclaimer, the term of this patent is extended or adjusted under 35 U.S.C. 154(b) by 464 days.

(21) Appl. No.: 14/551,511

(22) Filed: Nov. 24, 2014

(65) Prior Publication Data

US 2016/0229357 A1    Aug. 11, 2016

(30) Foreign Application Priority Data

Nov. 28, 2013  (EP) .................................. 13400031

(51) Int. Cl.
*H02G 3/00* (2006.01)
*B60R 16/02* (2006.01)
(Continued)

(52) U.S. Cl.
CPC ....... *B60R 16/0215* (2013.01); *H02G 3/0437* (2013.01); *H02G 3/06* (2013.01); *H02G 3/0608* (2013.01)

(58) Field of Classification Search
CPC .... B60R 16/0215; H02G 3/0437; H02G 3/06; H02G 3/0608; H02G 3/045; F16B 5/00; F16B 5/0008; F16L 3/26
(Continued)

(56) References Cited

U.S. PATENT DOCUMENTS 3,792,189 A    2/1974  Stengel et al.
4,864,082 A *  9/1989  Ono ..................... H02G 3/0437
                                                    138/115
(Continued)

FOREIGN PATENT DOCUMENTS

CN        2325901 Y    6/1999
CN        2485847 Y    4/2002
(Continued)

OTHER PUBLICATIONS

Extended European Search Report for EP 13400031.4, Completed by the European Patent Office, Dated May 19, 2014, 5 Pages.
(Continued)

*Primary Examiner* — Anita M King
(74) *Attorney, Agent, or Firm* — Brooks Kushman P.C.

(57) ABSTRACT

A raceway for fastening, guiding and/or protecting an electric cable means has channel modules with longitudinal channel sections. At least two essentially longitudinal channel sections are movable telescopically into one another by way of complementary male elements or female elements, and each of the essentially longitudinal channel sections is provided with at least one fixation bolt. The male element projects from a part of an open end of one essentially longitudinal channel section and the female element is cut out from a part of an open end of an opposed essentially longitudinal channel section. The essentially longitudinal channel sections are made of thermoplastic material and the at least one fixation bolt is mounted inside the channel section through the base wall of each essentially longitudinal channel section.

20 Claims, 4 Drawing Sheets

(51) Int. Cl.
*H02G 3/06* (2006.01)
*H02G 3/04* (2006.01)

(58) Field of Classification Search
USPC .......................................................... 248/49
See application file for complete search history.

(56) References Cited

U.S. PATENT DOCUMENTS

| | | | | |
|---|---|---|---|---|
| 4,951,716 A * | 8/1990 | Tsunoda | ............... | H02G 3/0418 138/157 |
| 5,271,585 A | 12/1993 | Zetena, Jr. | | |
| 5,597,980 A * | 1/1997 | Weber | ................. | H02G 3/0418 123/143 C |
| 6,002,089 A * | 12/1999 | Hemingway | ........ | H02G 3/0406 174/97 |
| 6,143,984 A * | 11/2000 | Auteri | ................. | H02G 3/0608 174/101 |
| 6,609,684 B2 * | 8/2003 | Van Scoy | ............... | F16G 13/16 248/49 |
| 6,861,589 B2 * | 3/2005 | Katsumata | ........... | H02G 3/0487 174/101 |
| 7,038,133 B2 * | 5/2006 | Arai | ..................... | H02G 3/0487 138/115 |
| 2010/0147584 A1 * | 6/2010 | Suzuki | ................ | B60R 16/0215 174/72 C |
| 2013/0118778 A1 * | 5/2013 | Takahashi | .............. | H01B 17/02 174/154 |

FOREIGN PATENT DOCUMENTS

| | | |
|---|---|---|
| CN | 201490644 U | 5/2010 |
| CN | 201742024 U | 2/2011 |
| DE | 7015776 | 11/1970 |
| DE | 3014695 A1 | 10/1981 |
| FR | 2481015 | 10/1981 |
| FR | 2680206 | 2/1993 |
| GB | 2399694 | 9/2004 |
| GB | 2407439 | 4/2005 |

OTHER PUBLICATIONS

Evans., NASA Contractor Report 4784 Aug. 1997, 72 Pages, "Design Guidelines for Shielding Effectiveness, Current Carrying Capability, and the Enhancement of Conductivity of Composite Materials.".

Chinese Office Action English translation for corresponding Chinese Application No. 201410387846.5, mailed Jul. 28, 2016, 12 pages.

* cited by examiner

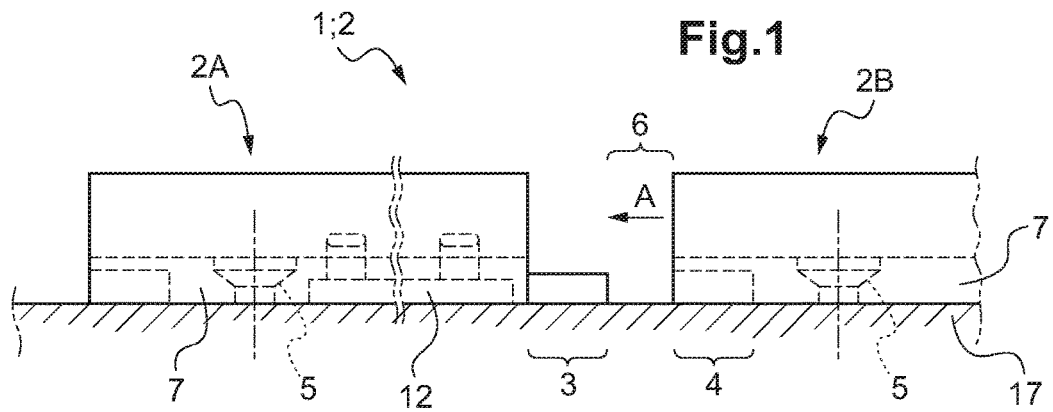
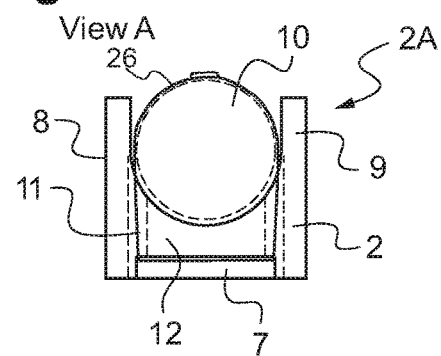
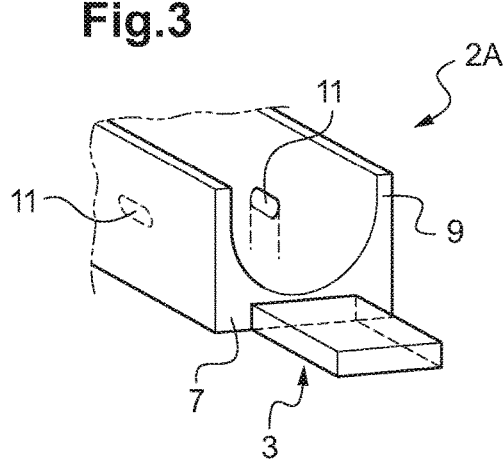
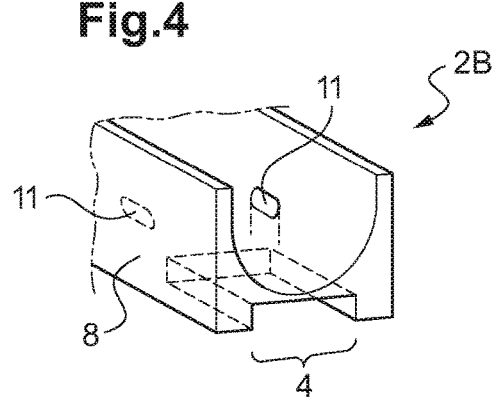

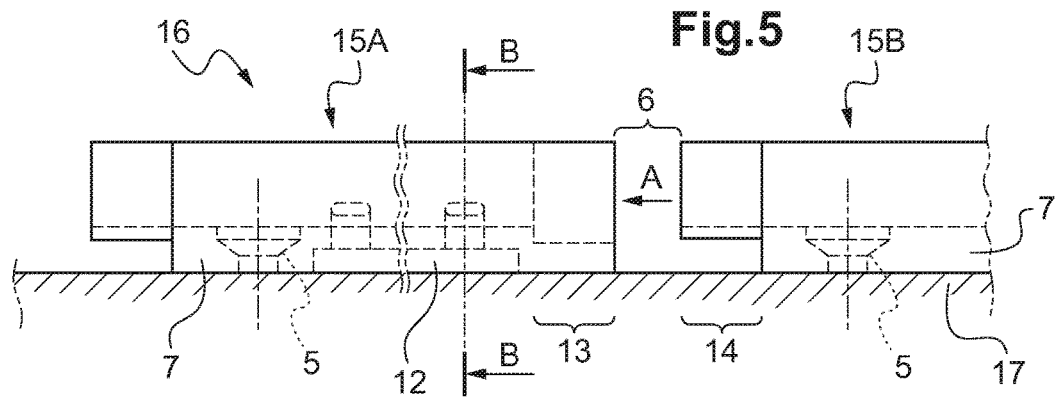
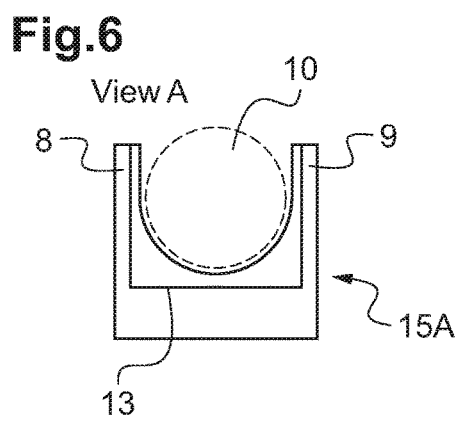
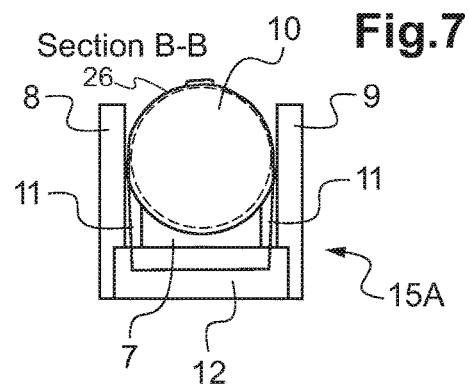
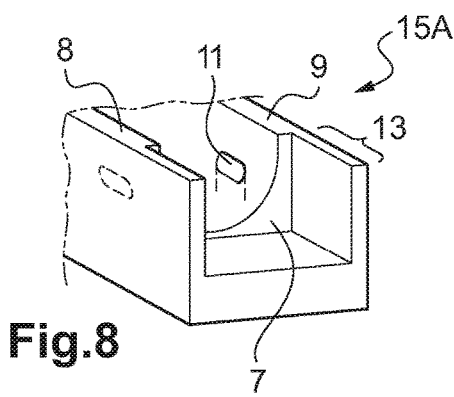
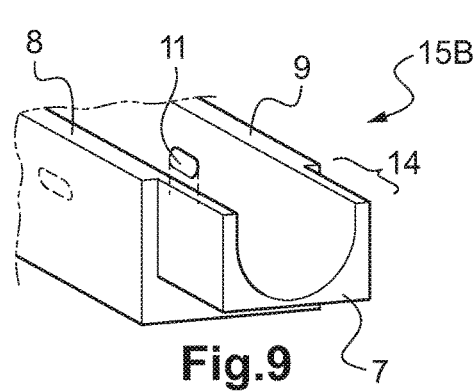
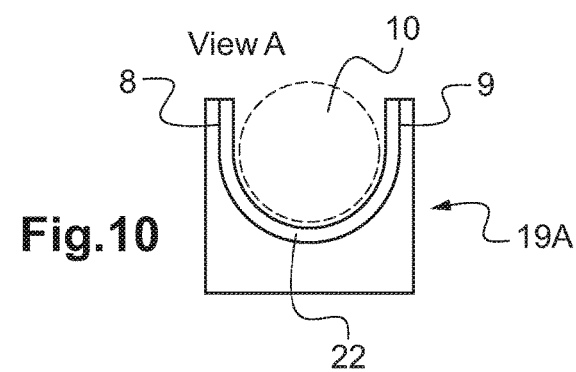

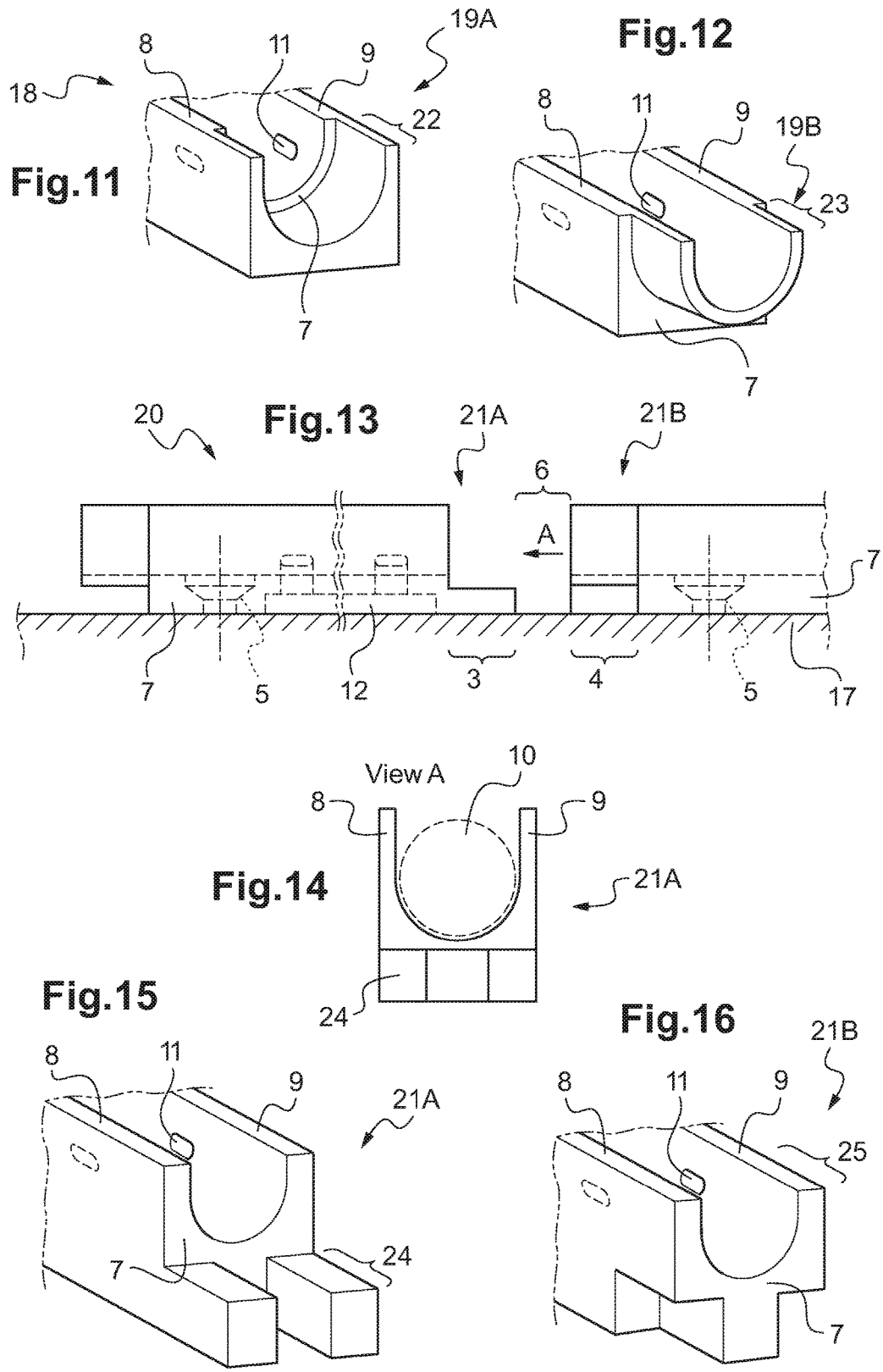

RACEWAY FOR FASTENING, GUIDING AND/OR PROTECTING ELECTRIC CABLE MEANS

CROSS REFERENCE TO RELATED APPLICATION

This application claims priority to European patent application No. EP 13 400031.4 filed on Nov. 28, 2013, the disclosure of which is incorporated in its entirety by reference herein.

BACKGROUND OF THE INVENTION (1) Field of the Invention

The invention is related to a raceway for fastening, guiding and protecting electric cable means with the features of the preamble of claim 1. The invention relates more particularly to the installation of the cabling on aircraft doors, in particular airplanes passenger doors or airplanes cargo doors.

(2) Description of Related Art

Vehicles, including automobiles, trucks, watercraft, and aircraft, have included electrical cabling for over a century. However, installation of these cables can be tedious and inefficient, due to the requirements of space, weight, and the amount of cabling required. For example, a modern airplane or ship may have more than a hundred miles of electrical wiring.

Composites, in particularly Carbon Fiber Reinforced Plastics (CFRP) are applied extensively throughout the fuselage of recently developed airplanes. This extensive use of CFRP raises problems, also relevant looking at the installation of electrical harnesses.

The document "Design guidelines: Design Guidelines for Shielding Effectiveness, Current Carrying Capability, and the Enhancement of Conductivity of Composite Materials", NASA Contractor Report 4784, R. W. Evans, Tec-Masters, Inc.• Huntsville, Ala.; August 1997" discloses risks of current injection into fiber reinforced composites parts (FRP) caused by damaged insulations of electric cables or cut electric cables where the routing of said cables is close to CFRP parts, leading most likely to undetected structural damages of the FRP and electric cables; e.g. loss of matrix integrity by heat induction.

The electric cable installation in doors, i.e. the electrical harness is also exposed to mechanical caused damages, among others since door areas are zones of higher risk of abusive load application. Especially for cargo doors and in cargo loading areas, abusive loads are a big issue since the electrical harnesses are well accessible and are often abused as handle bars.

Drilling holes and cut outs lead to disrupted fibers in CFRP structures. Said disrupted fibers cause losses in the strength properties of the CFRP structures and are cost increasing too, due to machining time and drilling tool deterioration. Therefore, drilling holes and cut outs for cable through routing should be avoided or at least reduced on CFRP structures, especially in areas, where the structure is highly loaded. Equally high numbers of rivets, needed for known harness fastening, destroy the carbon fibers.

Some standard parts, such as support clamps for electric cables provide for some protection against current injection but imply many drilling holes on CFRP structures and are not suited for mechanical protection. Harnesses provide for mechanical and/or electrical protection without any solution for the number of drilling holes on CFRP structures.

The document U.S. Pat. No. 3,792,189 A discloses a raceway for housing and protecting electric cable means along structural parts. The raceway comprises at least two essentially longitudinal housings each with a base wall integral with essentially parallel side walls. Said base wall and said side walls provide a cable canal open at opposed ends of each of said at least two essentially longitudinal housings. Said at least two essentially longitudinal housings are movable telescopically into one another at said open end by means of complementary male element or female element means and each of said essentially longitudinal housings is provided with at least one fixation bolt to the housing.

The document GB 200324766 A (GB 2407439 A) discloses a device providing a protective sleeve around a bundle of one or more cables and bridging gaps between raceway sections. The device comprises a substantially flat, bendable web portion, having at least one opening adjacent one edge and a guide, slidable through the at least one opening, projecting from the opposite edge. The device is preferably formed from a single component, and is formed from PTFE.

The document U.S. Pat. No. 5,271,585 discloses a fiber optics cable raceway formed of main channel members and telescope members. The main channel members have a generally U-shaped cross-section with a base, sides, and, at the top, inwardly extending lips. The telescope members have the same cross-section, but are slightly larger so they can fit about the main channel members for a longitudinally sliding fit. By alternately, interfitting main members and telescope members and adjusting the length by telescopic sliding, a raceway of the desired length can quickly be assembled. Small locking clips can then be fitted about the respective overlapping lips of two members to prevent further sliding. The raceway can be installed below the floor by the use of brackets hanging on pre-existing floor-supporting pedestals. It can be installed above a dropped ceiling by the use of hangers clamped to the grid struts of the ceiling. The locking clips serve to electrically interconnect the channel members and the telescope members.

French patent application FR 2 481 015 A1 discloses a cable raceway formed by individual elements, each made by injection and comprising a lower part, side walls and, optionally, an upper part, the individual elements being attached by means of an extension in one of the element that fits into a housing of the adjacent element.

Likewise, French patent application FR 2 680 206 A1 discloses another cable raceway formed by a plurality of elements having an U-shape cross section and being linked by the fitting of one element's extension into another element's slide channel.

Utility model DE 70 15 776 U and UK patent application GB 2 399 694 discloses yet further cable raceways in which the elements may be locked by introducing a protrusion into the next element's housing.

BRIEF SUMMARY OF THE INVENTION

It is an objective of the invention to provide an improved raceway for protecting electric cable means with less required attachment provisions. It is a further objective of the invention to provide a method of mounting said raceway to a structural part and of mounting the electric cable means into the raceway.

The solution is provided with a raceway for electric cable means with the features of claim 1 of the invention. A further solution is provided with a method of mounting said raceway to a structural part and mounting the electric cable means into the raceway with the features of claim 9 of the invention. Preferred embodiments of the invention are provided with the subclaims.

According to the invention a raceway for fastening, guiding and/or protecting electric cable means along or on top of structural parts, particularly along or on top of structural parts of an aircraft, comprises at least two channel modules each with essentially longitudinal channel sections with a base wall integral with essentially parallel side walls. Said base wall and said side walls provide a channel section open at both ends of each of said at least two essentially longitudinal channel sections. Said at least two essentially longitudinal channel sections are movable telescopically during installation, into one another at said open ends by means of complementary male element or female element means.

Each of said essentially longitudinal channel sections is provided with at least one fixation bolt for fixation of the at least two essentially longitudinal channel sections relative to each other and to the structural parts while at least one of said essentially longitudinal channel sections is provided with at least two fixation bolts for fixation of the at least two essentially longitudinal channel sections relative to each other and to the structural parts. Said at least one essentially longitudinal channel section provided with at least two fixation bolts for fixation of the at least two essentially longitudinal channel sections relative to each other and to the structural parts is preferably arranged at an end of the inventive raceway.

The invention provides a raceway for fastening, guiding and protecting electric cable means that allows the installation of the raceway itself on the structural parts and the installation of the electric cables, e.g. as harnesses, in the at least two essentially longitudinal channel sections with comparatively low effort and eases the maintenance of the harness of said electric cables. The invention provides maximal protection properties for the electric cable combined with less required attachment provisions to any CFRP structure and reduced assembling effort in general.

According to a further aspect of the invention said male element means are projecting from a part of an open end of one essentially longitudinal channel section and said female element means are spared from a part of an open end of an opposed essentially longitudinal channel section, said essentially longitudinal channel sections being made of thermoplastic material.

The inventive raceway provides extended mechanical protection for any electric cable mounted inside the channel section and continued electrical isolation due to the use of thermoplastics, e.g. the use of isolating polymers and the overlapping of the channel sections.

The inventive raceway provides for the minimized attachment effort with less holes and attachment parts, e.g. rivets, bolts, etc. and the inventive raceway thus avoids disrupted fibers in CFRP structures caused by drilling holes and cut outs. Consequently the inventive raceway limits the deterioration of the strength properties of the concerned CFRP structures by avoiding drilling holes and cut outs for cable through routing on CFRP structures. As a consequence the invention provides potential for structural weight reduction of the concerned CFRP structures.

Any rotation of a channel section of the inventive raceway is locked by means of just one fixation bolt plus the fixation by the neighboring channel sections. In that way the neighboring parts lock each other except preferably at the start/end of a line of a channel section, conducted straight or curved, where at least one additional fixation bolt is needed for rotation locking of said channel section. The routing of the inventive raceway—straight or curved—is totally controllable over lifetime and sagging and/or swelling is not an issue at all.

The inventive raceway provides a modular system with regard to parameters such as size, length and material to cover the needs of different geometrical environments with a low number of different channel sections, said channel sections being easily processed.

The inventive raceway allows compensation of significant in/decrease of length depending on the material humidity and the used thermoplastic material due to the telescopic feature providing compensation for unintentionally elongated or shortened channel sections.

The inventive raceway avoids the risk of current injection caused by damaged cable insulation or cut cables even if said cables are close to the CFRP parts of the aircraft, and thus prevents undetected structural damages; e.g. loss of matrix integrity by heat induction. The inventive raceway further avoids load application directly to the harness by surrounding rigid channel sections with a base wall and side walls adapted to the cable means along the inside of the channel sections.

The inventive raceway provides fixation, mechanical and electrical protection at once without additional line guidance with the advantage of reduced weight, reduced assembling effort and low mounting effort for the cables onto the raceway.

Along the channel sections of the inventive raceway pairwise slots are integrated for electric cable/harness fixation to the channel sections by tying means. The pairwise slots are distant to each other along the channel sections of the inventive raceway.

According to a preferred embodiment of the invention said complementary male element and female element means are provided with telescopic length compensation while continuous electrical and mechanical protection is provided because of the overlapping telescope principle on one side combined with one bolt fixation at the opposite side of the channel section.

According to a still further aspect of the invention preferably one fixation hole is mounted inside essentially straight channel sections through said base wall of each essentially longitudinal channel section, whereas curved or straight channel sections and channel sections at ends of the inventive raceway are provided with two fixation holes i.e. one fixation hole next to each of two ends of curved or straight and end channel sections.

According to a preferred embodiment of the invention a method of mounting the raceways to the structural part and mounting the electric cable means into the raceway comprises the steps of:—Providing tying means, e.g. plastic clips, with free ends, —Providing channel sections with pairwise slots respectively next to each of side walls through the base wall to a clearance in the base wall, each of said channel sections having female element means and male element means at opposed ends, —Passing the free ends from the clearance through each of the pairwise slots and extending said free ends towards the open top of the channel sections, —Mounting at least two of said essentially longitudinal channel sections with one passed through plastic clip per pairwise slot along or on top of the structural part while compensating length variations by inserting the female element means more or less far into the male element means, —Mounting each of the respective channel sections after fixation through the at least one hole to or on top of the structural part, —Inserting the electric cable means along the raceway through the open top into the longitudinal channel sections between the free ends of the plastic clips, and—
Joining and tightening the free ends of the tying means about the electric cable means.

The inventive method allows particularly cost efficient mounting of composite raceways with enhanced adaption potential at reduced constructive effort, said raceway fastening, guiding and protecting electric cable means mounted inside the longitudinal channel sections.

BRIEF DESCRIPTION OF THE SEVERAL VIEWS OF THE DRAWINGS

Preferred embodiments of the invention are presented by means of the following description with reference to the attached drawings, from which in FIG. 1 a lateral view of two channel sections of a raceway according to the invention is shown, FIG. 2 a cross-sectional view of one channel section of the raceway of FIG. 1 is shown, FIG. 3 a perspective view of one channel section with male element means of the raceway of FIG. 1 is shown, FIG. 4 a perspective view of one channel section with female element means of the raceway of FIG. 1 is shown, FIG. 5 a lateral view of two channel sections of a preferred raceway according to the invention is shown, FIG. 6 a frontal view of one channel section of the preferred raceway of FIG. 5 is shown, FIG. 7 a cross-sectional view of one channel section of the preferred raceway of FIG. 5 is shown, FIG. 8 a perspective view of one channel section with female element means of the preferred raceway of FIG. 5 is shown, FIG. 9 a further perspective view of one channel section with male element means of the preferred raceway of FIG. 5 is shown, FIG. 10 a frontal view of another channel section according to the invention is shown, FIG. 11 a perspective view of said another channel section with female element means according to the invention is shown, FIG. 12 a further perspective view of said another channel section with male element means according to the invention is shown, FIG. 13 a lateral view of two channel sections of the raceway according to the invention is shown, FIG. 14 a frontal view of still another channel section according to the invention is shown, FIG. 15 a perspective view of said still another channel section with female element means according to the invention is shown, FIG. 16 a further perspective view of said still another channel section with male element means according to the invention is shown, FIG. 17 a side view and a top view of an incident straight channel module according to the invention are shown, FIG. 18 top views of an incident curved channel modules according to the invention are shown, FIG. 19 two side views and two top views of straight end channel modules according to the invention are shown, and FIG. 20 top views of an curved end channel modules according to the invention are shown.

DETAILED DESCRIPTION OF THE INVENTION

Figure 17:
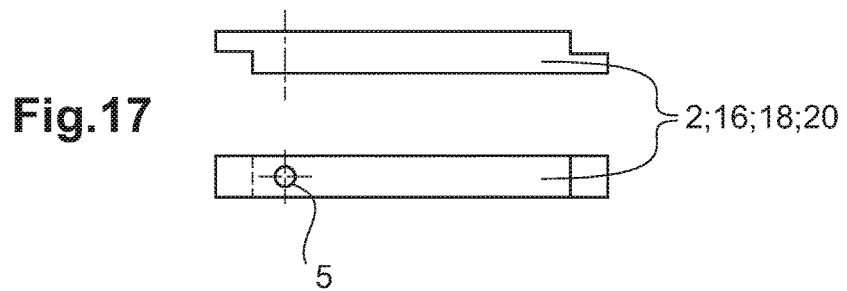

According to FIG. 1 a raceway 1 comprises a channel module 2 with two channel sections 2A, 2B aligned along a common longitudinal axis and facing each other with respective ends at a junction area 6. The two channel sections 2A, 2B are made of polyamide or any other thermoplastic material. The respective ends are essentially planar, rectangular and perpendicular with regard to the common longitudinal axis of the two channel sections 2A, 2B. The channel sections 2A, 2B extend essentially longitudinally including curved and bifurcated shapes. E.g. a curved channel section 2A, 2B encloses an angle of 90°.

Essentially cubic male element means 3 are provided at one end of the channel section 2A. Corresponding cubic female element means 4 as a complement to the essentially cubic male element means 3 are provided at the end of channel sections 2B. The channel sections 2A, 2B are each provided with cubic female element means 4 at one end and complementary cubic male element means 3 at the opposed end for the provision of a modular construction system.

With a distance of 15-35 mm to one end of each of the two channel sections 2A, 2B a hole 5 for a fixation bolt (not shown) with a diameter of 4-7 mm is provided in a base wall 7 for fixation of each of the channel sections 2A, 2B to a structural part, particularly for fixation along at least a door of an aircraft (not shown).

A clearance 12 essentially parallel to and below the base wall 7 is provided for tying means 26 for withholding electric cable means 10 (see FIG. 2) inside the channel sections 2A, 2B.

According to FIG. 2 corresponding features are referred to with the references of FIG. 1. Each of the two channel sections 2A, 2B are formed by the base wall 7 and side walls 8, 9 raising essentially rectangular with regard to the base wall 7. The side walls 8, 9 leave the channel sections 2A, 2B open towards the top. The base wall 7 closes the channel sections 2A, 2B towards the bottom except for pairwise slots 11 opening passages inside the channel sections 2A, 2B through the base wall 7 respectively next to the side walls 8, 9 for the tying means 26 to the clearance 12 below the base wall 7. The channel sections 2A, 2B are shaped semicircular between the base wall 7 and the side walls 8, 9 for a proper fitting of electric cable means 10 with an essentially circular cross section for insertion inside the channel sections 2A, 2B. The cable means 10 are a single cable in a harness (not shown), a bundle of cables in a harness (not shown) or a bundle of harnessed cables (not shown). A harness diameter ranges from 2-50 mm or preferably from 5-20 mm.

According to FIG. 3 corresponding features are referred to with the references of FIG. 1, 2. The channel section 2A is formed by the base wall 7 and the side walls 8, 9 raising essentially rectangular with regard to the base wall 7 for provision of a channel section open at both ends of each of said at least two essentially longitudinal channel sections 2A, 2B. Essentially cubic male element means 3 are provided from one end of the channel section 2A at the bottom along a central section of the base wall 7. Pairwise slots 11 inside the channel sections 2A, 2B through the base wall 7 are respectively located next to the side walls 8, 9 for the tying means 26 to the clearance 12 below the base wall 7 (see as well FIG. 4).

According to FIG. 4 corresponding features are referred to with the references of FIG. 1-3. The channel section 2B is formed by the base wall 7 and side walls 8, 9 raising essentially rectangular with regard to the base wall 7 for provision of a channel section open at both ends of each of said at least two essentially longitudinal channel sections 2A, 2B. The essentially rectangular female element means 4 is provided in one end of the channel section 2B at the bottom along a central section of the base wall 7 adapted for accommodation of the essentially rectangular male element means 3.

According to FIG. 5 corresponding features are referred to with the references of FIG. 1-4. A preferred channel module 16 comprises two further channel sections 15A, 15B for alignment along a common longitudinal axis and facing each other with respective ends at the junction area 6. The two further channel sections 15A, 15B are made of polyamide or any other thermoplastic material. The respective ends are essentially planar, rectangular and perpendicular with regard to the common longitudinal axis of the two further channel sections 15A, 15B.

Essentially u-shaped female element means 13 (see as well FIG. 8) are provided at one end of the further channel section 15A. Correspondingly u-shaped male element means 14 (see as well FIG. 9) as a complement to the essentially u-shaped female element means 13 are provided at the end of the further channel section 15B. The further channel sections 15A, 15B are each provided with u-shaped female element means 14 at one end and complementary u-shaped male element means 13 at the opposed end for the provision of a modular construction system.

With a distance of 15-35 mm to one end of each of the two further channel sections 15A, 15B a hole 5 for a fixation bolt (not shown) with a diameter of 4-7 mm is provided in the base wall 7 for fixation of each of the further channel sections 15A, 15B to a structural part 17, particularly for fixation along at least a door of an aircraft (not shown).

The clearance 12 essentially parallel to and below the base wall 7 is provided for tying means 26 for withholding electric cable means 10 (see FIG. 6, 7) inside the further channel sections 15A, 15B.

According to FIG. 6, 7 corresponding features are referred to with the references of FIG. 1-5. Each of the two further channel sections 15A, 15B are formed by the base wall 7 and side walls 8, 9 raising essentially rectangular with regard to the base wall 7. The side walls 8, 9 leave the further channel sections 15A, 15B open towards the top. The base wall 7 closes the further channel sections 15A, 15B towards the bottom except for pairwise slots 11 opening passages inside the further channel sections 15A, 15B through the base wall 7 respectively next to the side walls 8, 9 for the tying means 26 to the clearance 12 below the base wall 7. The further channel sections 15A, 15B are shaped semicircular between the base wall 7 and the side walls 8, 9 for a proper fitting of the electric cable means 10 with an essentially circular cross section for insertion inside the further channel sections 15A, 15B.

According to FIG. 8 corresponding features are referred to with the references of FIG. 1-7. The further channel section 15B is formed by the base wall 7 and side walls 8, 9 raising essentially rectangular with regard to the base wall 7 for provision of a channel section open at both ends of each of said at least two essentially longitudinal channel sections 15A, 15B. Essentially rectangular u-shaped female element means 13 are spared longitudinally along a section of the outside of the base wall 7 and the side walls 8, 9 of the further channel section 15A for accommodation of essentially rectangular u-shaped male element means 14.

According to FIG. 9 corresponding features are referred to with the references of FIG. 1-8. The further channel section 15A is formed by the base wall 7 and the side walls 8, 9 raising essentially rectangular with regard to the base wall 7 for provision of a channel section open at both ends of each of said at least two essentially longitudinal further channel sections 15A, 15B. Essentially rectangular u-shaped male element means 14 project longitudinally from one end of the further channel section 15B with a set off from the outer circumference of the further channel section 15B. One of the pairwise slots 11 inside the further channel section 15B passes through the base wall 7 next to the side wall 9 for the tying means 26 to the clearance 12 below the base wall 7 (see as well FIG. 5, 7).

According to FIGS. 10-12 corresponding features are referred to with the references of FIG. 1-9. Each of two still further channel sections 19A, 19B of another channel module 18 are formed by the base wall 7 and side walls 8, 9 raising essentially rectangular with regard to the base wall 7. The further channel section 19B is provided with rounded u-shaped male element means 23 projecting longitudinally from one end of the further channel section 19B with a set off from the outer circumference of the further channel section 19B. Essentially rounded u-shaped female element means 22 are spared longitudinally along a section of the outside of the base wall 7 and the side walls 8, 9 of the further channel section 19A for accommodation of the essentially rectangular male element means 23.

The respective pairwise slots 11 inside the further channel section 19A, 19B pass through the base wall 7 next to the side wall 9 for the tying means 26 to the clearance 12 below the base wall 7 (see as well FIG. 5, 7).

According to FIGS. 13-16 corresponding features are referred to with the references of FIG. 1-12. Still another channel module 20 comprises two channel sections 21A, 21B aligned along the common longitudinal axis and facing each other with respective ends at the junction area 6. The two channel sections 21A, 21B are made of polyamide or any other thermoplastic material. The respective ends are essentially planar, rectangular and perpendicular with regard to the common longitudinal axis of the two channel sections 21A, 21B. Essentially fork type male element means 24 are provided at one end of the channel section 21A. Corresponding nose type female element means 25 as a complement to the essentially fork type male element means 24 are provided at the end of channel section 21B. The channel sections 21A, 21B are each provided with fork type male element means 24 at one end and complementary nose type female element means 25 at the opposed end for the provision of a modular construction system for the raceway 20.

According to FIG. 17 corresponding features are referred to with the references of FIG. 1-16. The channel modules 2, 16, 18, 20 for insertion in an inclined position of any of the raceways 1 are straight with one fixation hole 5 each next to one end. The channel sections 2A, 2B, 19A, 19B, 21A, 21B are respectively provided with male element means 3, 14, 23 or 25 at one end and complementary female element means 4, 13, 22, 24 at the opposed end.

Figure 18:
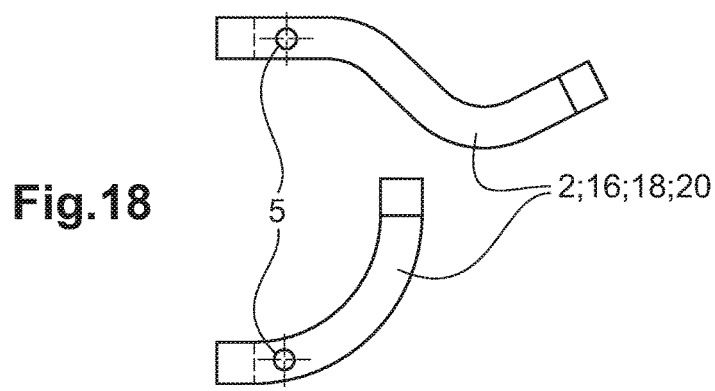

According to FIG. 18 corresponding features are referred to with the references of FIG. 1-17. The channel modules 2, 16, 18 or 20 for insertion in an inclined position of any of the raceways 1 are curved with one or more arcs and with one fixation hole 5 each next to one end. The channel sections 2A, 2B, 19A, 19B, 21A, 21B are respectively provided with male element means 3, 14, 23 or 25 at one end and complementary female element means 4, 13, 22, 24 at the opposed end.

Figure 19:
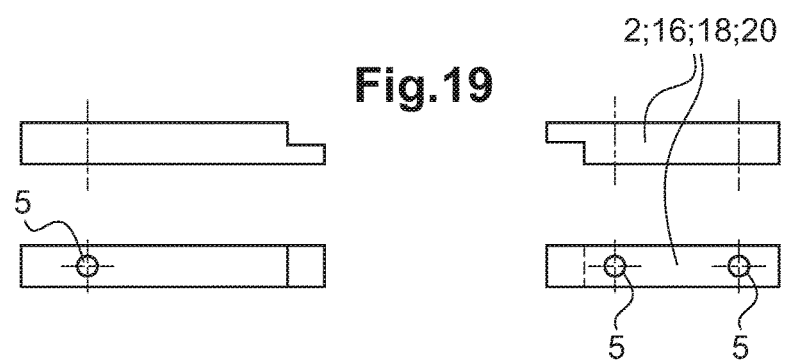

According to FIG. 19 corresponding features are referred to with the references of FIG. 1-18. The channel modules 2, 16, 18, 20 for insertion in an end position of any of the raceways 1 are straight with one or two fixation holes 5 each next to one end. The channel sections 2A, 2B, 19A, 19B, 21A, 21B are provided with male element means 3, 14, 23 or 25 or complementary female element means 4, 13, 22, 24 at one end.

Figure 20:
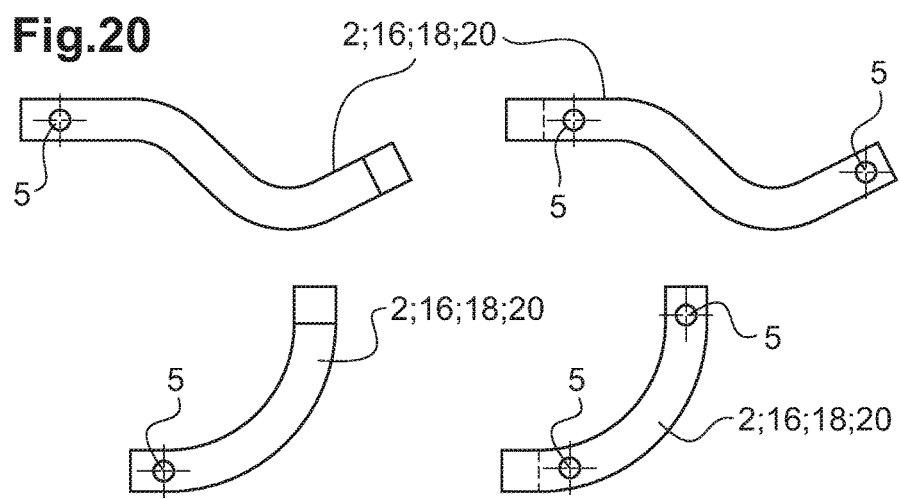

According to FIG. 20 corresponding features are referred to with the references of FIG. 1-19. The channel modules 2, 16, 18 or 20 for insertion in an end position of any of the raceways 1 are curved with one or more arcs and with one or two fixation holes 5 each next to one end. The channel sections 2A, 2B, 19A, 19B, 21A, 21B are respectively provided with male element means 3, 14, 23 or 25 or complementary female element means 4, 13, 22, 24 at one end.

Method of mounting the raceway 1 to the structural part 17 and method of mounting the electric cable means 10 into the raceway 1.

The channel modules 2, 16, 18 or 20 with compatible channel sections 2A, 2B, 19A, 19B, 21A, 21B are suitable for combination with each other to raceways 1 of different designs. Free ends of the tying means 26 are passed from the clearance 12 through each of the pairwise slots 11 of each of the channel modules 2, 16, 18 or 20, said free ends extending towards the open top of the channel sections 2A, 2B, 15A, 15B.

The at least two essentially longitudinal channel sections 2A, 2B, 15A, 15B with one passed through tying means 26 per pairwise slot 11 are mounted along or on top of the structural part 17 according to e.g. a routing diagram. The telescopic junctions 6 allow compensation of length variations by inserting the female element means 4, 14 more or less far into the cubic male element means 13 of the respective channel sections 2A, 2B, 15A, 15B. After adaption each of the longitudinal channel sections 2A, 2B, 15A, 15B are mounted by a fixation bolt through the hole 5 to or on top of the structural part 17 whereby the fixation with one bolt through one hole 5 per longitudinal channel section 2A, 2B, 15A, 15B allows further rotational adaption of the longitudinal channel sections 2A, 2B, 15A, 15B to the structural part 17. Longitudinal channel sections 2A, 2B, 15A, 15B with respectively two holes 5 for a fixation bolt at each end of the raceway 1 are provided for curved channel sections 2A, 2B, 15A, 15B If a curved part is localized in the middle of the raceway 1 only one hole 5 is sufficient for attachment.

After mounting of the longitudinal channel sections 2A, 2B, 15A, 15B to or on top of the structural part 17 the electric cable means 10 are inserted along the raceway 1 through the open top into the longitudinal channel sections 2A, 2B, 15A, 15B between the free ends of the plastic clips 26. The free ends of the plastic clips 26 are joined above the inserted electric cable means 10 and tightened to retain the electric cable means 10 inside the longitudinal channel sections 2A, 2B, 15A, 15B.

REFERENCE LIST

1 Raceway
2 Channel module
2A channel section
2B channel section
3 male element
4 female element
5 hole
6 Junction area/Telescopic area
7 base wall
8 side wall
9 side wall
10 cable means
11 Slots for cable tying means
12 clearance
13 u-shaped male element
14 u-shaped female element
15A further channel section
15B further channel section
16 preferred channel module
17 structural part
18 another channel module
19A still further channel section
19B still further channel module
20 still another channel module
21A further channel section
21B further channel section
22, 24 female element
23, 25 male element
26 tying means

What is claimed is:

1. A raceway of at least two channel modules for fastening, guiding and/or protecting an electric cable along or on top of at least one structural part, particularly along or on top of at least one structural part of an aircraft, the channel modules comprising:
   essentially longitudinal channel sections each with a base wall integral with essentially parallel side walls, the base wall and the side walls providing an open end at both ends of each of the at least two essentially longitudinal channel sections, the at least two essentially longitudinal channel sections being movable telescopically into one another at the open ends by means of complementary male and female elements and each of the essentially longitudinal channel sections is provided with at least one fixation hole wherein:
   the male element projects from a central part of an open end of one essentially longitudinal channel section and the female element is spared from another central part of the open end of an opposed essentially longitudinal channel section;
   the essentially longitudinal channel sections are made of thermoplastic material; and
   the at least one fixation hole is inside each one of the channel sections through the base wall of each essentially longitudinal channel section,
   characterized in that pairwise slots are provided inside the channel sections respectively next to each of the side walls through the base wall to a clearance in the base wall, the pairwise slots and the clearance forming an opening passage for a cable tying ring.

2. The raceway according to claim 1, wherein the thermoplastic material is an isolating polymer comprising a polyamide.

3. The raceway according to claim 1, wherein the complementary male and female elements are provided with length compensation.

4. The raceway according to claim 1, wherein the complementary male and female elements are pairwise cubic, rectangular or rounded u-shaped.

5. The raceway according to claim 1 comprising curved essentially straight and bifurcated channel sections.

6. The raceway according to claim 1, wherein one fixation hole is mounted inside essentially straight channel sections through the base wall.

7. The raceway according to claim 1, wherein curved channel sections and channel sections at ends are provided with two fixation holes, with one fixation hole of the two fixation holes respectively next to each of two ends of curved and end channel sections.

8. A method of mounting a raceway to a structural part and mounting an electric cable into the raceway, the method comprising the steps of:
providing a plastic clip with free ends;
providing at least two channel modules for fastening, guiding and/or protecting the electric cable along or on top of the least one structural part of an aircraft, the channel modules comprising essentially longitudinal channel sections each with a base wall integral with essentially parallel side walls, the base wall and the side walls providing an open end at both ends of each of the at least two essentially longitudinal channel sections, the at least two essentially longitudinal channel sections being movable telescopically into one another at the open ends by means of complementary male and female elements and each of the essentially longitudinal channel sections is provided with at least one fixation hole, wherein the male element projects from a central part of an open end of one essentially longitudinal channel section and the female element is spared from another central part of the open end of an opposed essentially longitudinal channel section, wherein the essentially longitudinal channel sections are made of thermoplastic material, and wherein the at least one fixation hole is inside each one of the channel sections through the base wall of each essentially longitudinal channel section, the channel sections provided with pairwise slots respectively next to each of side walls through the base wall to a clearance in the base wall and inside the channel sections;
passing the free ends from the clearance through each of the pairwise slots and extending the free ends towards the open top of the channel sections;
mounting at least two essentially longitudinal channel sections with one passed through plastic clip per pairwise slot along or on top of the structural part while compensating of length variations by inserting the female element more or less far into the male element;
mounting each of the respective channel sections after adaption through the at least one hole to or on top of the structural part;
inserting the electric cable along the raceway through the open top into the longitudinal channel sections between the free ends of the plastic clips; and
joining and tightening the free ends of the plastic clips about the electric cable.

9. The method according to claim 8, wherein the thermoplastic material is an isolating polymer comprising a polyamide.

10. The method according to claim 8, wherein the complementary male and female elements are provided with length compensation.

11. The method according to claim 8, wherein the complementary male and female elements are pairwise cubic, rectangular or rounded u-shaped.

12. The method according to claim 8, wherein the raceway comprises curved essentially straight and bifurcated channel sections.

13. The method according to claim 8, wherein one fixation hole is mounted inside essentially straight channel sections through the base wall.

14. The method according to claim 8, wherein curved channel sections and channel sections at ends are provided with two fixation holes, with one fixation hole of the two fixation holes respectively next to each of two ends of curved and end channel sections.

15. A channel module having a raceway for fastening, guiding and/or protecting an electric cable along or on top of at least one structural part of an aircraft, the raceway comprising:
a first channel section having first and second side walls extending integrally from a base wall to form an open channel extending longitudinally to receive a cable, the first channel section defining first and second longitudinally spaced open ends at first and second junction areas, the first junction area defining a male element and the second junction area defining a complementary female element, the base wall defining at least one fixation hole extending from an inside surface of the base wall and the open channel to an opposite outer surface of the base wall, the at least one fixation hole sized to receive a fixation bolt and spaced apart from the first and second junction areas;
a second channel section having first and second side walls extending integrally from a base wall to form an open channel extending longitudinally to receive a cable, the second channel section defining first and second longitudinally spaced open ends at first and second junction areas, the first junction area defining the male element and the second junction area defining the complementary female element, the base wall defining at least one fixation hole extending from an inside surface of the base wall and the open channel to an opposite outer surface of the base wall, the at least one fixation hole sized to receive a fixation bolt and spaced apart from the first and second junction areas;
wherein the male element of each channel section projects from a central part of the associated junction area, and the female element of each channel section is spared from another central part of the associated junction area;
wherein the first and second channel sections comprise a thermoplastic material;
wherein the side walls of each of the first and second channel sections define pairwise slots extending from a surface of the open channel towards the base wall; and
wherein the base wall of each of the first and second channel sections defines a clearance intersecting the pairwise slots of the associated channel section thereby forming a passage for a plastic clip.

16. The channel module of claim 15 wherein the clearance is spaced apart from the inside surface of the base wall and the open channel.

17. The channel module of claim 15 wherein the clearance intersects the outer surface of the base wall.

18. The channel module of claim 15 further comprising a plastic clip.

19. The channel module of claim 15 wherein the male element of one of the first and second channel sections is slidably received by the female element of the other of the first and second channel sections to provide a telescopic junction between the first and second channel sections to align the first and second channel sections relative to one another and provide variation in overall length of the first and second channel sections.

20. The channel module of claim 15 wherein each of the first and second channel sections comprises at least one of straight and curved shapes.

* * * * *